(12) United States Patent
Kadiyala et al.

(10) Patent No.: US 11,163,661 B2
(45) Date of Patent: Nov. 2, 2021

(54) TEST CASE GENERATION FOR A HARDWARE STATE SPACE

(71) Applicant: International Business Machines Corporation, Armonk, NY (US)

(72) Inventors: Madhusudan Kadiyala, Bangalore (IN); Narasimha R. Adiga, Bangalore (IN); Manoj Dusanapudi, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 16/537,516

(22) Filed: Aug. 9, 2019

(65) Prior Publication Data

US 2021/0042202 A1 Feb. 11, 2021

(51) Int. Cl.
*G06F 11/00* (2006.01)
*G06F 11/263* (2006.01)
*G06F 11/273* (2006.01)

(52) U.S. Cl.
CPC .......... *G06F 11/263* (2013.01); *G06F 11/273* (2013.01)

(58) Field of Classification Search
CPC ....... G06F 11/263; G06F 11/273; G06F 11/26
See application file for complete search history.

(56) References Cited

U.S. PATENT DOCUMENTS

| 7,434,101 | B2 | 10/2008 | Adir et al. |
| 7,516,430 | B2* | 4/2009 | Chadha ................. G06F 11/263 703/14 |
| 7,627,843 | B2 | 12/2009 | Dozorets et al. |
| 7,752,006 | B2 | 7/2010 | Copty et al. |
| 8,868,976 | B2 | 10/2014 | Ben-Yehuda et al. |
| 10,061,672 | B2 | 8/2018 | Dagan et al. |
| 2003/0130813 | A1 | 7/2003 | Adir et al. |
| 2004/0181763 | A1* | 9/2004 | Soltis, Jr. ........ G01R 31/318307 716/111 |
| 2006/0117237 | A1* | 6/2006 | Weller ........... G01R 31/318371 714/742 |
| 2006/0212756 | A1 | 9/2006 | Emek et al. |
| 2007/0006046 | A1* | 1/2007 | Overman ............. G06F 11/3414 714/38.1 |
| 2011/0145643 | A1 | 6/2011 | Kumar et al. |
| 2013/0191689 | A1* | 7/2013 | Almog ................ G06F 11/2236 714/35 |

* cited by examiner

*Primary Examiner* — Joseph D Manoskey
(74) *Attorney, Agent, or Firm* — Teddi Maranzano (57) ABSTRACT

Test case generation for a hardware state space including: identifying, from a first test case comprising a first plurality of test operations executed by a processor comprising a first configuration, a test operation causing an invalid result; determining a functional path associated with the test operation; generating a second plurality of test operations based on the functional path; generating a processor state by executing, by the processor comprising a second configuration, a subset of the first plurality of test operations comprising the determined test operation; and generate a second test case comprising the second plurality of test operations configured for execution based on the processor state.

20 Claims, 7 Drawing Sheets

TEST CASE GENERATION FOR A HARDWARE STATE SPACE

BACKGROUND

Field of the Invention

The field of the invention is data processing, or, more specifically, methods, apparatus, and products for test case generation for a hardware state space.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Test case generation for a hardware state space including identifying, from a first test case comprising a first plurality of test operations executed by a processor comprising a first configuration, a test operation causing an invalid result; determining a functional path associated with the test operation; generating a second plurality of test operations based on the functional path; generating a processor state by executing, by the processor comprising a second configuration, a subset of the first plurality of test operations comprising the determined test operation; and generate a second test case comprising the second plurality of test operations configured for execution based on the processor state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
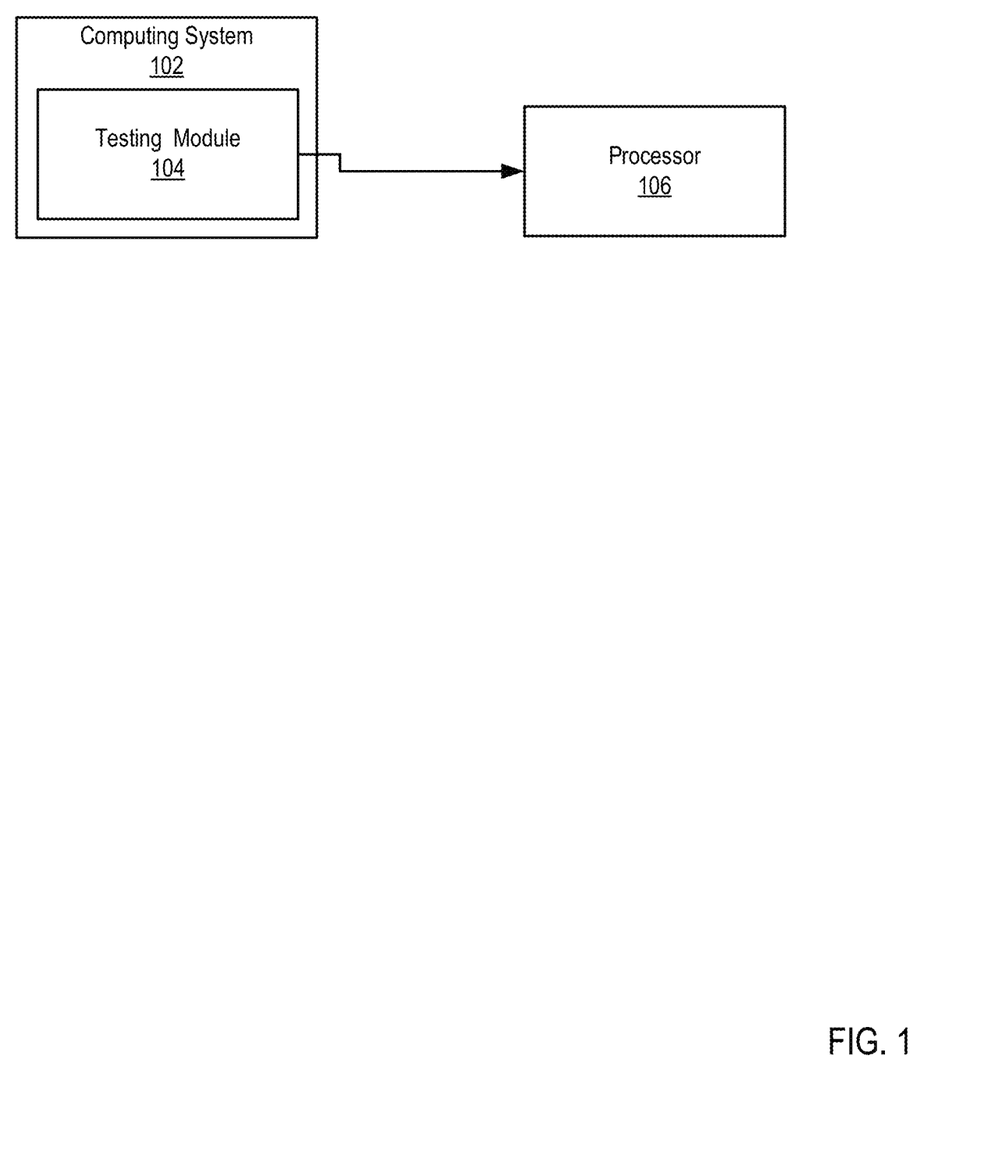
FIG. 1 is a diagram of an example system for test case generation for a hardware state space according to embodiments of the present disclosure.

Exemplary methods, apparatus, and products for test case generation for a hardware state space in accordance with the present invention are described with reference to the accompanying drawings, beginning with FIG. 1. FIG. 1 sets forth a diagram of a system configured for test case generation for a hardware state space according to embodiments of the present invention. The system of FIG. 1 includes a computing system 102 having a testing module 104 and communicatively coupled to a processor 106. The computing system 102 comprises one or more computing devices configured to execute the testing module 104. The testing module 104 is configured to perform test case generation for a hardware state space with respect to the processor 106.

For example, assume the processor 106 is in the design stage where hardware or configuration revisions may be made. Accordingly, the processor 106 may be considered to comprise a first configuration. The testing module 104 may be configured to execute, on the processor 106, a first test suite comprising a first plurality of test operations. The test operations comprise one or more functions or instructions that are executable by the processor 106. The test operations are configured to produce a verifiable result (e.g., a verifiable output or state) to determine if the processor 106 is functioning properly.

The testing module 104 may be configured to provide the first plurality of test operations to the processor 106 for execution. The testing module 104 may monitor an output of the first plurality of test operations, a state of the processor 106 (e.g., values or instructions stored in memory, states of functional units, etc.), or other attributes of the processor 106 to determine of a given test operation has passed.

The first plurality of test operations of the first test suite may comprise a plurality of static or predefined test operations. In other words, the parameters and inputs of the first plurality of test operations remain identical for each execution of the first plurality of test operations. The first plurality of test operations may also be generated based on a test case template. The test case template may comprise one or more test operations with one or more variable attributes. For example, the variable attributes may comprise inputs to a given function, constraints, values or data stored in memory of the processor 106, etc. Accordingly, the first plurality of test operations may be generated based on a test case template and a seed value used to generate the variable attributes.

During execution of the first plurality of test operations by the processor 106, a test case operation causing an invalid result may be identified by the testing module 104. For example, execution of a test case operation may produce an unexpected output. As another example, execution of a test case operation may result in an unexpected processor 106 state. As a further example, execution of a test case operation may cause an error in execution. This may be indicative of a bug in the processor 106. The processor 106 may then be redesigned or reconfigured to address the bug.

Execution of a test suite that produces a bug may be a rare occurrence (e.g., one out of one thousand test suites). Accordingly, determining if a second configuration of the processor 106 both adequately addressed the bug and did not negatively impact other components of the processor 106 may be difficult, as merely repeatedly running random test suites may not target an impacted functional area of the processor 106. Accordingly, after identifying the test operation causing an invalid result, the testing module 104 can determine a functional path associated with the test operation. A functional path of a test operation may comprise one or more components of the processor required to execute a test operation (e.g., functional units, cores, registers, areas of memory, etc.). A functional path of a test operation may also comprise a particular physical area of the processor 106 (e.g., an area on the dye or traces of the processor 106). A given test operation may correspond to one or more tags indicating a particular functional path associated with the test operation. Accordingly, identifying the functional path associated with the test operation may comprise identifying the one or more tags.

The testing module 104 may then generate a second plurality of test operations based on the functional path. The second plurality of test operations are generated to target a functional path of the processor 106 associated with the identified test operation in order to verify that the second configuration of the processor 106 has not introduced new bugs while fixing the originally identified bug. For example, one or more test case templates may be assigned tags indicating a functional area targeted by the generated test case operations. Accordingly, generating the second plurality of test operations may comprise selecting a test case template associated with the functional path (e.g., the determined tag), and generating, based on the test case template, the second plurality of test operations. The second plurality of test operations may be generated based on the test case template and a seed value.

The testing module 104 may then generate a processor state by executing, by the processor 106 comprising the second configuration, a subset of the first plurality of test operations comprising the determined test operation. For example, assuming the first plurality of test operations comprises a sequence of test operations, the subset may comprise the first test operation of the sequence up to and including the determined test operation. By executing the subset of the first plurality of test operations by the processor 106 comprising the second configuration, it can be determined that the second configuration has corrected the bug present in the first configuration. Moreover, the state of the processor 106 after executing the determined test operation allows for subsequent test operations targeting the determined functional area (e.g., the second plurality of test operations) to be executed.

The state of the processor 106 may comprise values stored in registers or memory of the processor 106. The state of the processor 106 may also comprise a state of an instruction pipeline of the processor 106. The state of the processor 106 may also comprise a state of latches, switches, or other functional components of the processor 106. Generating the processor state may comprise determining, by the testing module 104, the state of the processor 106 and encoding the state of the processor 106. The encoded state of the processor 106 may then be loaded into the processor 106 such that the processor 106 reflects the encoded state.

Where the first plurality of test operations comprises a static sequence of test operations, generating the processor state may comprise executing the static sequence of test operations up to the determined test operation. Where the first plurality of test operations is based on a test case template and a seed value, generating the processor state may comprise generating the subset of the first plurality of test operations based on a same seed value. In other words, the processor state is generated using the same test case template and seed value as were used to initially generate the first plurality of test operations.

The testing module 104 may then generate a second test case comprising the second plurality of test operations configured for execution based on the processor state. In other words, executing the second test case may cause the processor state to be loaded into the processor 106. The second plurality of test operations may then be executed by the processor 106 (e.g., comprising the second configuration) from the processor state. Thus, test operations targeting the functionality of the processor 106 affected by the initially identified bug may be executed from the processor state.

The testing module 104 may also generate additional test cases for execution by the processor 106 based on the processor state. For example, a third test case may be generated by selecting a new test case template associated with the determined functional path. As another example, a third test case may be generated by selecting a new seed value for an already selected template. Thus, the determined functional path of the processor 106 may be repeatedly targeted by test cases to ensure proper functionality.

Test case generation for a hardware state space in accordance with the present invention is generally implemented with computers, that is, with automated computing machinery. For further explanation, therefore, FIG. 2 sets forth a block diagram of automated computing machinery comprising an exemplary computing system 102 configured test case generation for a hardware state space according to embodiments of the present invention. The computing system 102 of FIG. 2 includes at least one computer processor 202 or 'CPU' as well as random access memory 204 ('RAM') which is connected through a high speed memory bus 206 and bus adapter 208 to processor 202 and to other components of the computing system 102.

Figure 2:
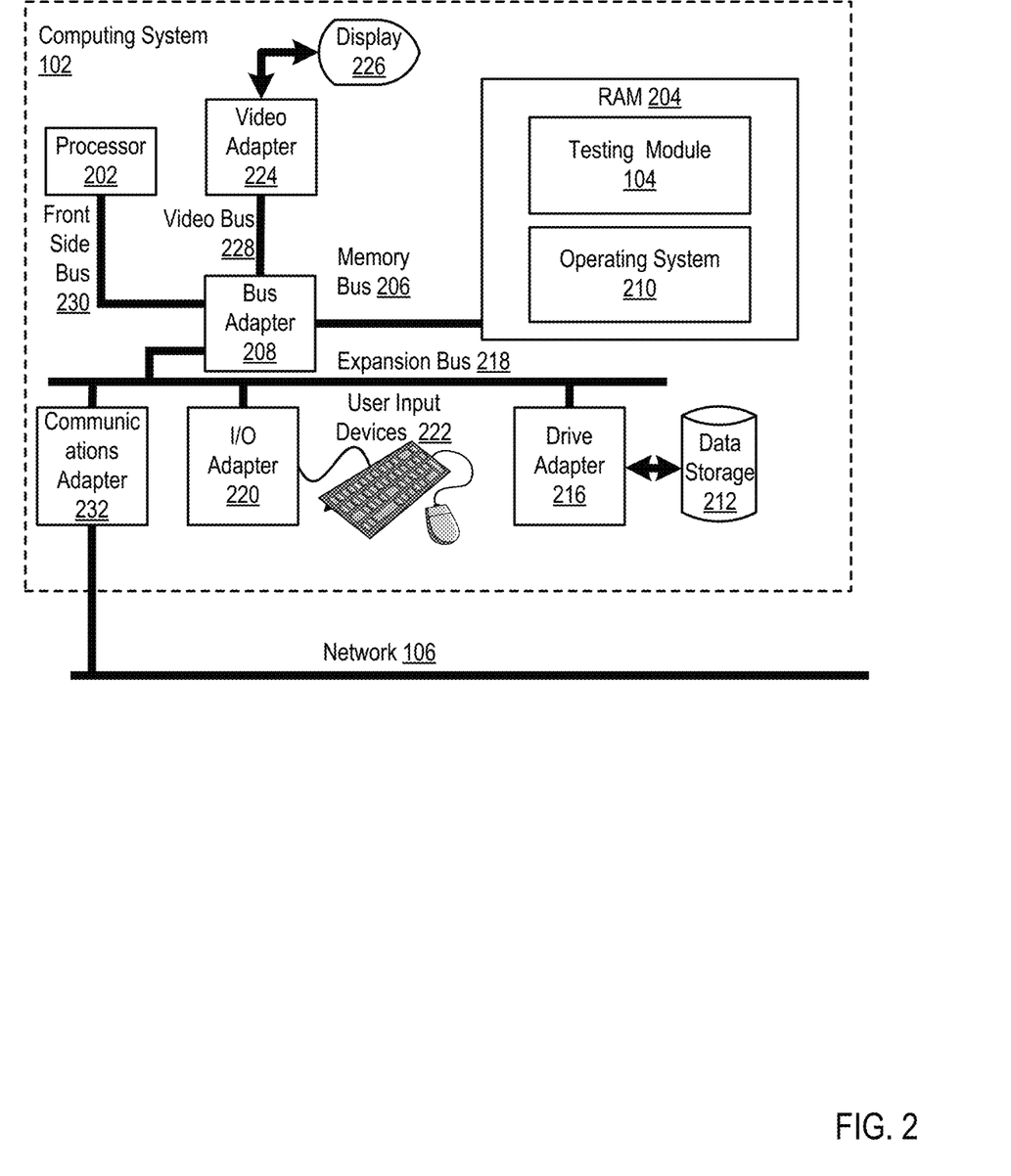
FIG. 2 is a block diagram of an example computing system for test case generation for a hardware state space according to embodiments of the present disclosure.

Stored in RAM 204 is an operating system 210. Operating systems useful in computers configured for test case generation for a hardware state space according to embodiments of the present invention include UNIX™, Linux™, Microsoft Windows™, AIX™, IBM's i OS™, and others as will occur to those of skill in the art. The operating system 208 in the example of FIG. 2 is shown in RAM 204, but many components of such software typically are stored in non-volatile memory also, such as, for example, on data storage 212, such as a disk drive. Also stored in RAM is the testing module 104 a module for test case generation for a hardware state space according to embodiments of the present invention.

The computing system 102 of FIG. 2 includes disk drive adapter 216 coupled through expansion bus 218 and bus adapter 208 to processor 202 and other components of the computing system 102. Disk drive adapter 216 connects non-volatile data storage to the computing system 102 in the form of data storage 212. Disk drive adapters useful in computers configured for test case generation for a hardware state space according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system 102 of FIG. 2 includes one or more input/output ('I/O') adapters 220. I/O adapters implement user-oriented input/output through, for example, software drivers and computer hardware for controlling output to display devices such as computer display screens, as well as user input from user input devices 222 such as keyboards and mice. The example computing system 102 of FIG. 2 includes a video adapter 224, which is an example of an I/O adapter specially designed for graphic output to a display device 226 such as a display screen or computer monitor. Video adapter 224 is connected to processor 202 through a high speed video bus 228, bus adapter 208, and the front side bus 230, which is also a high speed bus.

The exemplary computing system 102 of FIG. 2 includes a communications adapter 232 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for test case generation for a hardware state space according to embodiments of the present invention include modems for wired dial-up communications, Ethernet (IEEE 802.3) adapters for wired data communications, and 802.11 adapters for wireless data communications.

The communications adapter 232 is communicatively coupled to a network 106 that also includes one or more affected devices 104, a knowledge base 108, and one or more potentially affected devices 112.

Figure 3:
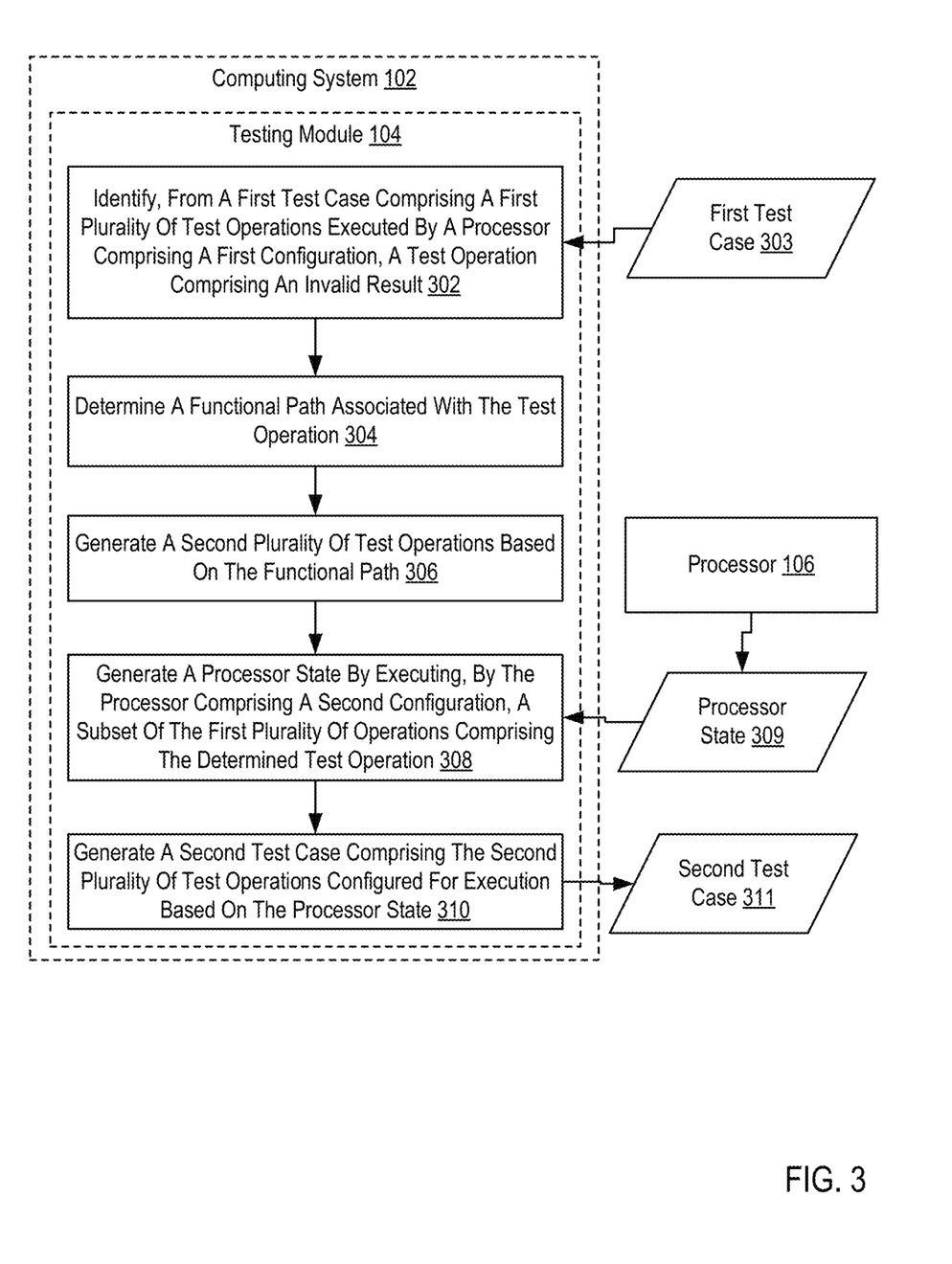
FIG. 3 is a flowchart of an example method for test case generation for a hardware state space according to embodiments of the present disclosure.

For further explanation, FIG. 3 sets forth a flow chart illustrating an exemplary method for test case generation for a hardware state space according to embodiments of the present invention that includes identifying 302 (e.g., by a testing module 104 of a computing system 102), from a first test case 303 comprising a first plurality of test operations executed by a processor 106 comprising a first configuration, a test operation comprising an invalid result.

The first plurality of test operations of the first test suite may comprise a plurality of static or predefined test operations. In other words, the parameters and inputs of the first plurality of test operations remain identical for each execution of the first plurality of test operations. The first plurality of test operations may also be generated based on a test case template. The test case template may comprise one or more test operations with one or more variable attributes. For example, the variable attributes may comprise inputs to a given function, constraints, values or data stored in memory of the processor 106, etc. Accordingly, the first plurality of test operations may be generated based on a test case template and a seed value used to generate the variable attributes.

For example, assume that during a past execution of the first plurality of test operations by the processor 106, a test case operation caused an invalid result. For example, execution of a test case operation may produce an unexpected output. As another example, execution of a test case operation may result in an unexpected processor 106 state. As a further example, execution of a test case operation may cause an error in execution. This may be indicative of a bug in the processor 106.

The method of FIG. 3 also includes determining 304 (e.g., by the testing module 104) a functional path associated with the test operation. A functional path of a test operation may comprise one or more components of the processor required to execute a test operation (e.g., functional units, cores, registers, areas of memory, etc.). A functional path of a test operation may also comprise a particular physical area of the processor 106 (e.g., an area on the dye or traces of the processor 106). A given test operation may correspond to one or more tags indicating a particular functional path associated with the test operation. Accordingly, identifying the functional path associated with the test operation may comprise identifying the one or more tags.

The method of FIG. 3 also includes generating 306 (e.g., by the testing module 104) a second plurality of test operations based on the functional path. The second plurality of test operations are generated to target a functional path of the processor 106 associated with the identified test operation in order to verify that the second configuration of the processor 106 has not introduced new bugs while fixing the originally identified bug. For example, one or more test case templates may be assigned tags indicating a functional area targeted by the generated test case operations. Accordingly, generating 306 the second plurality of test operations may comprise selecting a test case template associated with the functional path (e.g., the determined tag), and generating, based on the test case template, the second plurality of test operations. The second plurality of test operations may be generated based on the test case template and a seed value.

The method of FIG. 3 also includes generating 308 (e.g., by the testing module 104) a processor state 309 by executing, by the processor 106 comprising the second configuration, a subset of the first plurality of test operations comprising the determined test operation. For example, assuming the first plurality of test operations comprises a sequence of test operations, the subset may comprise the first test operation of the sequence up to and including the determined test operation. By executing the subset of the first plurality of test operations by the processor 106 comprising the second configuration, it can be determined that the second configuration has corrected the bug present in the first configuration. Moreover, the processor state 309 allows for subsequent test operations targeting the determined functional area (e.g., the second plurality of test operations) to be executed.

The processor state 309 may comprise values stored in registers or memory of the processor 106. The processor state 309 may also comprise a state of an instruction pipeline of the processor 106. The processor state 309 may also comprise a state of latches, switches, or other functional components of the processor 106. Generating the processor state may comprise determining, by the testing module 104, the processor state 309 and processor state 309. The encoded processor state 309 may then be loaded into the processor 106 such that the processor 106 reflects the encoded state.

Where the first plurality of test operations comprises a static sequence of test operations, generating 308 the processor state 309 may comprise executing the static sequence of test operations up to the determined test operation. Where the first plurality of test operations is based on a test case template and a seed value, generating 308 the processor state 309 may comprise generating the subset of the first plurality of test operations based on a same seed value. In other words, the processor state 309 is generated using the same test case template and seed value as were used to initially generate the first plurality of test operations.

The method of FIG. 3 also includes generating 310 (e.g., by the testing module 104) a second test case 311 comprising the second plurality of test operations configured for execution based on the processor state 309. In other words, executing the second test case 311 may cause the processor state 309 to be loaded into the processor 106. The second plurality of test operations may then be executed by the processor 106 (e.g., comprising the second configuration) from the processor state 309. Thus, test operations targeting the functionality of the processor 106 affected by the initially identified bug may be executed from the processor state.

Figure 4:
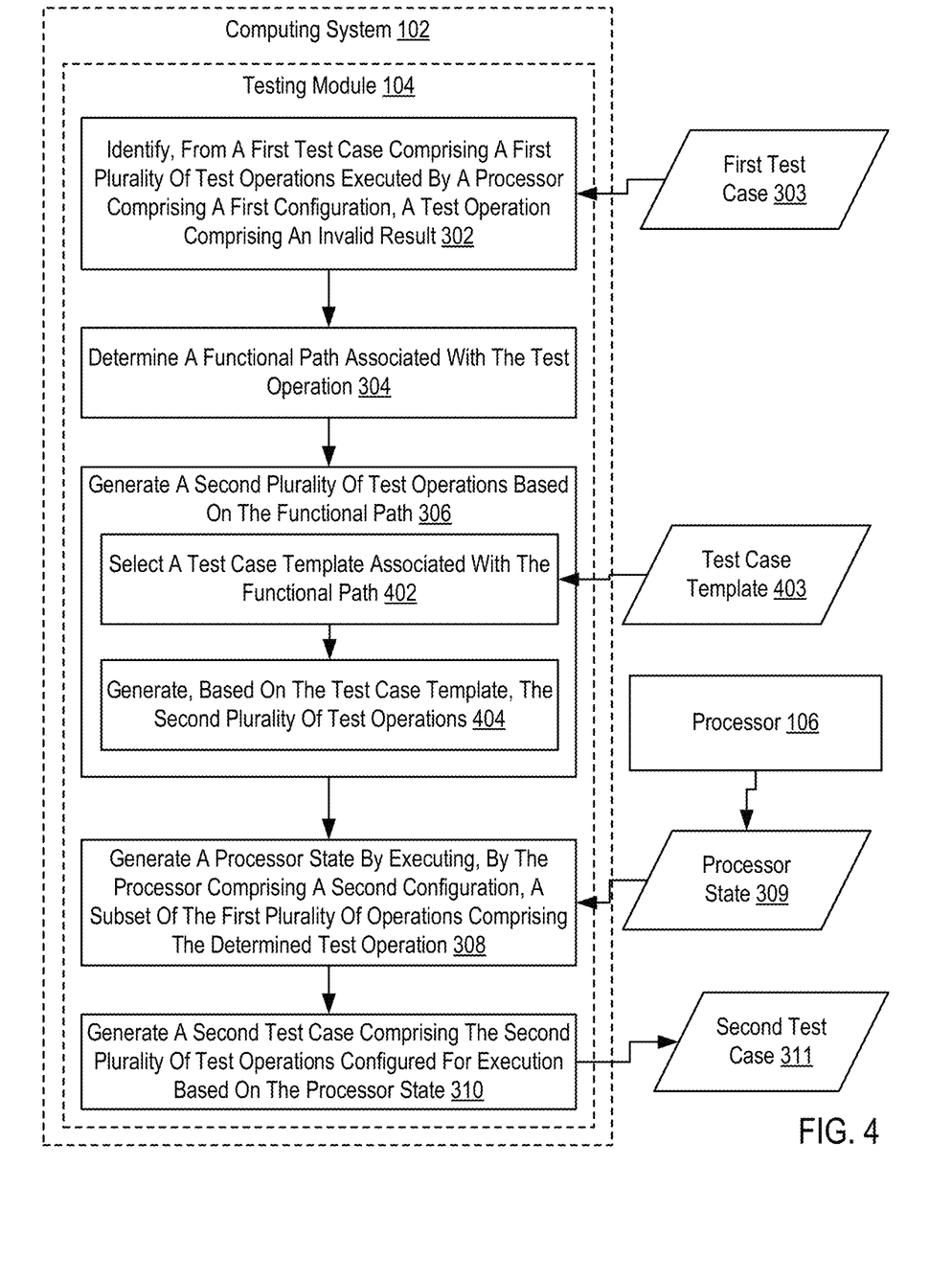
FIG. 4 is a flowchart of an example method for test case generation for a hardware state space according to embodiments of the present disclosure.

For further explanation, FIG. 4 sets forth a flow chart illustrating an exemplary method for test case generation for a hardware state space according to embodiments of the present invention that includes identifying 302 (e.g., by a testing module 104 of a computing system 102), from a first test case 303 comprising a first plurality of test operations executed by a processor 106 comprising a first configuration, a test operation comprising an invalid result; determining 304 a functional path associated with the test operation; generating 306 a second plurality of test operations based on the functional path; generating a processor state 309 by executing, by the processor 106, a subset of the first plurality of operations comprising the determined test operation; and generating 310 a second test case 311 comprising the second plurality of test operations configured for execution based on the processor state 309.

FIG. 4 differs from FIG. 3 in that generating 306 a second plurality of test operations based on the functional path comprises selecting 402 a test case template associated with the functional path. For example, assume that the determined test operation that comprised an invalid result corresponds to a tag indicating a functional area of the processor 106 affected by the test operation. Further assume that a plurality of test case templates 403 each comprise one or more tags indicating the functional paths affected by the test operations generated based on the respective test case templates 403. Accordingly, selecting 402 a test case template 403 associated with the functional path may comprise selecting a test case template 403 comprising a tag of the functional path.

FIG. 4 further differs from FIG. 3 in that generating 306 a second plurality of test operations based on the functional path comprises generating 404 based on the test case template 403, the second plurality of test operations. For example, a seed value may be determined (e.g., randomly generated, selected from a pool of seed values, selected based on a rotation or cycle of seed values, etc.) The seed value may be used to generate variable attributes of the test case template 403 for the second plurality of test operations. For example, the seed value may be used as a seed for a random number generator to generate constraints, values, inputs, data stored in memory, etc. for test operations of the test case template.

Figure 5:
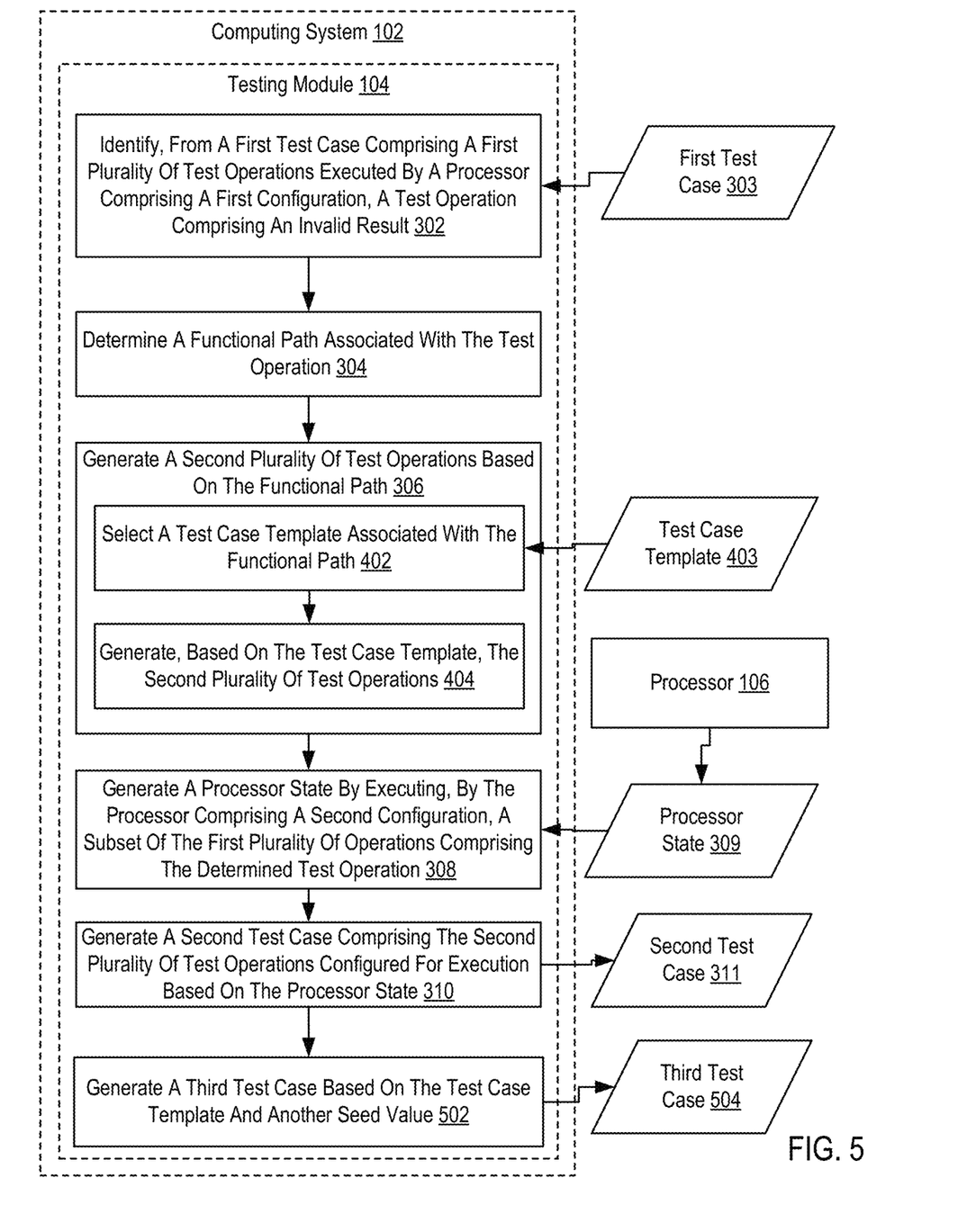
FIG. 5 is a flowchart of an example method for test case generation for a hardware state space according to embodiments of the present disclosure.

For further explanation, FIG. 5 sets forth a flow chart illustrating an exemplary method for test case generation for a hardware state space according to embodiments of the present invention that includes identifying 302 (e.g., by a testing module 104 of a computing system 102), from a first test case 303 comprising a first plurality of test operations executed by a processor 106 comprising a first configuration, a test operation comprising an invalid result; determining 304 a functional path associated with the test operation; generating 306 a second plurality of test operations based on the functional path by selecting 402 a test case template associated with the functional path and generating 404 based on the test case template 403, the second plurality of test operations; generating a processor state 309 by executing, by the processor 106, a subset of the first plurality of operations comprising the determined test operation; and generating 310 a second test case 311 comprising the second plurality of test operations configured for execution based on the processor state 309.

FIG. 5 differs from FIG. 4 in that the method of FIG. 5 further comprises generating 502 (e.g., by the testing module) a third test case 504 based on the test case template 403 and another seed value. For example, given that a second plurality of test operations were generated using a particular test case template 403, a third plurality of test operations may be generated using that test case template 403 and a different seed value. Thus, the third plurality of test operations may be similar to the second plurality of test operations, but vary in their variable attributes through the use of different seed values. The third plurality of test operations may be included in a third test case 504. The third plurality of test operations may then be executed based on the generated processor state 309 to further test the functional area of the processor 106 associated with the initially identified bug.

Figure 6:
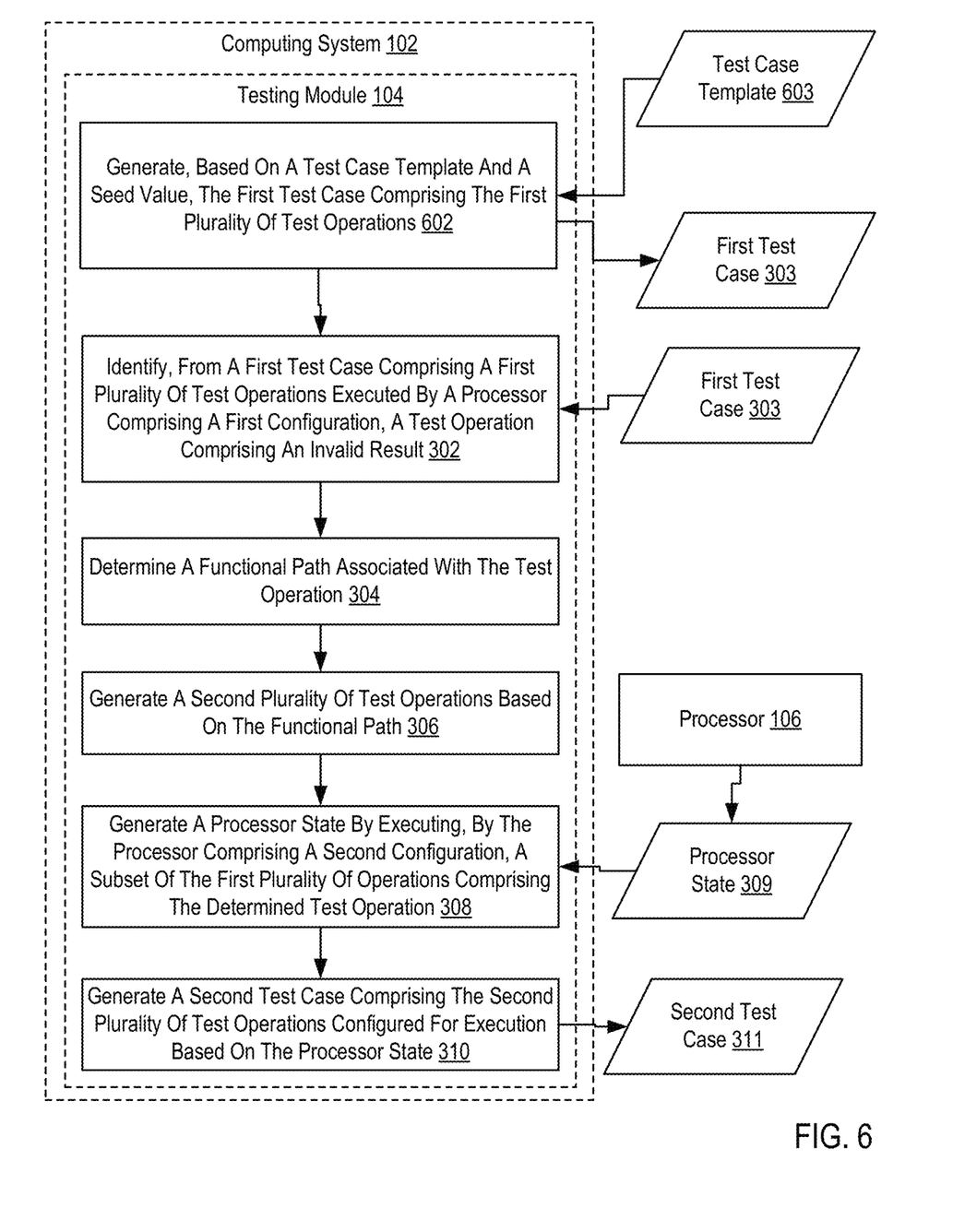
FIG. 6 is a flowchart of an example method for test case generation for a hardware state space according to embodiments of the present disclosure.

For further explanation, FIG. 6 sets forth a flow chart illustrating an exemplary method for test case generation for a hardware state space according to embodiments of the present invention that includes identifying 302 (e.g., by a testing module 104 of a computing system 102), from a first test case 303 comprising a first plurality of test operations executed by a processor 106 comprising a first configuration, a test operation comprising an invalid result; determining 304 a functional path associated with the test operation; generating 306 a second plurality of test operations based on the functional path by selecting 402 a test case template associated with the functional path and generating 404 based on the test case template 403, the second plurality of test operations; generating a processor state 309 by executing, by the processor 106, a subset of the first plurality of operations comprising the determined test operation; and generating 310 a second test case 311 comprising the second plurality of test operations configured for execution based on the processor state 309.

FIG. 6 differs from FIG. 4 in that the method of FIG. 6 further comprises generating 602 (e.g., by the testing module 104), based on a test case template 603 and a seed value, the first test case 303 comprising the first plurality of test operations. For example, the seed value may be determined randomly, selected from a pool of seed values, determined based on a rotation of seed values, or otherwise determined. The seed value may then serve as a seed for a random number generator or other logic to generate variable attributes for the test case template 603. For example, constraints, inputs, stored data or memory values, or other attributes may be generated based on the seed value to generate the first test case 303. The first test case 303 may then be executed to identify a test operation that comprises an invalid result.

Figure 7:
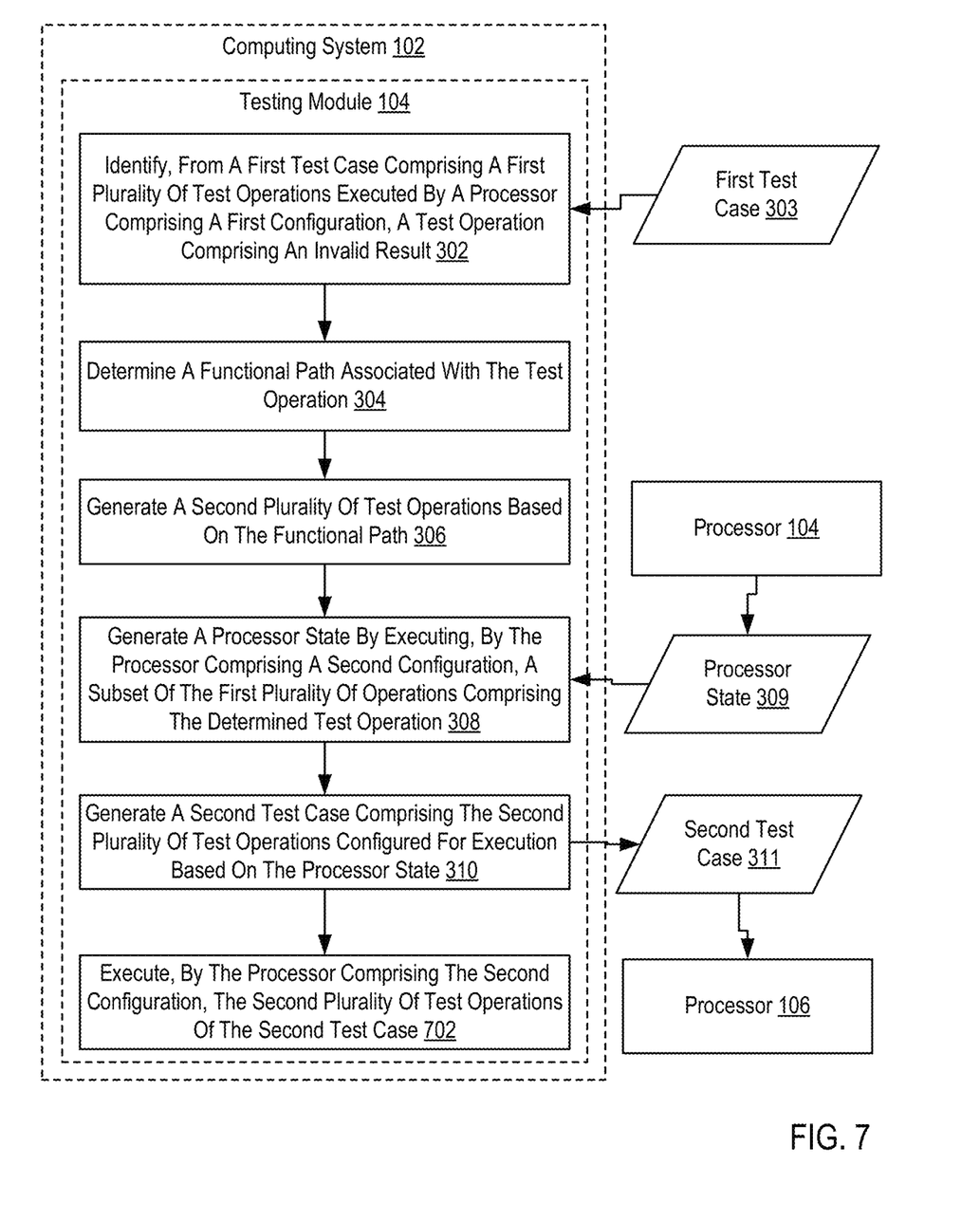
FIG. 7 is a flowchart of an example method for test case generation for a hardware state space according to embodiments of the present disclosure.

For further explanation, FIG. 7 sets forth a flow chart illustrating an exemplary method for test case generation for a hardware state space according to embodiments of the present invention that includes identifying 302 (e.g., by a testing module 104 of a computing system 102), from a first test case 303 comprising a first plurality of test operations executed by a processor 106 comprising a first configuration, a test operation comprising an invalid result; determining 304 a functional path associated with the test operation, generating 306 a second plurality of test operations based on the functional path; generating a processor state 309 by executing, by the processor 106, a subset of the first plurality of operations comprising the determined test operation; and generating 310 a second test case 311 comprising the second plurality of test operations configured for execution based on the processor state 309.

FIG. 7 differs from FIG. 3 in that the method of FIG. 7 further comprises, executing 702 (e.g., by the testing module 103), by the processor 106 comprising the second configuration, the second plurality of test operations of the second test case 311. The second plurality of test operations may be executed based on the processor state 309. For example, the testing module 104 may access the previously generated processor state 309 and load the processor state 309 in the processor 106. Thus, the processor 106 is configured according to the processor state 309. For example, stored memory values, instruction pipelines, latch or switch states, or other attributes of the processor 106 may be set according to the stored processor state 309. The second plurality of instructions may then be executed by the processor 106 configured according to the processor state 309.

In view of the explanations set forth above, readers will recognize that the benefits of test case generation for a hardware state space according to embodiments of the present invention include:
   Improved performance of a computing system by allowing for repeated execution of tests specifically targeting a functional path of a processor.
   Improved performance of a computing system testing a functional path of a revised processor to ensure that configuration changes do not introduce additional bugs.

Exemplary embodiments of the present invention are described largely in the context of a fully functional computer system for Improved performance of a computing system by allowing for repeated execution of tests specifically targeting a functional path of a processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of test case generation for a hardware state space, the method comprising:
    identifying, from a first test case comprising a first plurality of test operations executed by a processor comprising a first configuration, a test operation causing an invalid result;
    determining a functional path associated with the test operation;
    generating a second plurality of test operations based on the functional path;
    generating a processor state by executing, by the processor comprising a second configuration, a subset of the first plurality of test operations comprising the determined test operation; and
    generate a second test case comprising the second plurality of test operations configured for execution based on the processor state.

2. The method of claim 1, wherein generating the second plurality of test operations comprises:
    selecting a test case template associated with the functional path; and
    generating, based on the test case template, the second plurality of test operations.

3. The method of claim 2, wherein generating, based on the test case template, the second plurality of test operations comprises generating, based on the test case template and a seed value, the second plurality of test operations, and the method further comprises generating, based on the test case template and another seed value, a third test case comprising a third plurality of test operations configured for execution based on the processor state.

4. The method of claim 2, further comprising:
    selecting another test case template associated with the functional area; and
    generating, based on the other test case template, a third test case comprising a third plurality of test operations configured for execution based on the processor state.

5. The method of claim 1, further comprising generating, based on a test case template and a seed value, the first test case comprising the first plurality of test operations.

6. The method of claim 5, wherein the subset of the first plurality of test operations is based on the test case template and the seed value.

7. The method of claim 1, further comprising executing, by the processor comprising the second configuration, the second plurality of test operations.

8. An apparatus for test case generation for a hardware state space, the apparatus comprising a computer processor, a computer memory operatively coupled to the computer processor, the computer memory having disposed within it computer program instructions that, when executed by the computer processor, cause the apparatus to carry out the steps of:
    identifying, from a first test case comprising a first plurality of test operations executed by a processor comprising a first configuration, a test operation causing an invalid result;
    determining a functional path associated with the test operation;
    generating a second plurality of test operations based on the functional path;
    generate a processor state by executing, by the processor comprising a second configuration, a subset of the first plurality of test operations comprising the determined test operation; and
    generate a second test case comprising the second plurality of test operations configured for execution based on the processor state.

9. The apparatus of claim 8, wherein generating the second plurality of test operations comprises:
    selecting a test case template associated with the functional path; and
    generating, based on the test case template, the second plurality of test operations.

10. The apparatus of claim 9, wherein generating, based on the test case template, the second plurality of test operations comprises generating, based on the test case template and a seed value, the second plurality of test operations, and the steps further comprise generating, based on the test case template and another seed value, a third test case comprising a third plurality of test operations configured for execution based on the processor state.

11. The apparatus of claim 9, wherein the steps further comprise:
   selecting another test case template associated with the functional area; and
   generating, based on the other test case template, a third test case comprising a third plurality of test operations configured for execution based on the processor state.

12. The apparatus of claim 8, wherein the steps further comprise generating, based on a test case template and a seed value, the first test case comprising the first plurality of test operations.

13. The apparatus of claim 12, wherein the subset of the first plurality of test operations is based on the test case template and the seed value.

14. The apparatus of claim 8, wherein the steps further comprise executing, by the processor comprising the second configuration, the second plurality of test operations.

15. A computer program product for test case generation for a hardware state space, the computer program product comprising a non-transitory computer readable storage medium with computer program instructions stored thereon that, when executed, cause a computer to carry out the steps of:
   identifying, from a first test case comprising a first plurality of test operations executed by a processor comprising a first configuration, a test operation causing an invalid result;
   determining a functional path associated with the test operation;
   generating a second plurality of test operations based on the functional path;
   generate a processor state by executing, by the processor comprising a second configuration, a subset of the first plurality of test operations comprising the determined test operation; and
   generate a second test case comprising the second plurality of test operations configured for execution based on the processor state.

16. The computer program product of claim 15, wherein generating the second plurality of test operations comprises:
   selecting a test case template associated with the functional path; and
   generating, based on the test case template, the second plurality of test operations.

17. The computer program product of claim 16, wherein generating, based on the test case template, the second plurality of test operations comprises generating, based on the test case template and a seed value, the second plurality of test operations, and the steps further comprise generating, based on the test case template and another seed value, a third test case comprising a third plurality of test operations configured for execution based on the processor state.

18. The computer program product of claim 16, wherein the steps further comprise:
   selecting another test case template associated with the functional area; and
   generating, based on the other test case template, a third test case comprising a third plurality of test operations configured for execution based on the processor state.

19. The computer program product of claim 15, wherein the steps further comprise generating, based on a test case template and a seed value, the first test case comprising the first plurality of test operations.

20. The computer program product of claim 19, wherein the subset of the first plurality of test operations is based on the test case template and the seed value.

* * * * *